United States Patent
Toyama et al.

(10) Patent No.: US 10,195,885 B2
(45) Date of Patent: Feb. 5, 2019

(54) INK, INKJET RECORDING METHOD, INK CARTRIDGE, AND IMAGE RECORDING DEVICE

(71) Applicants: Kaori Toyama, Kanagawa (JP); Yuuki Yokohama, Kanagawa (JP); Hiromi Sakaguchi, Kanagawa (JP); Hideaki Nishimura, Kanagawa (JP); Masayuki Fukuoka, Tokyo (JP); Shuusuke Someno, Kanagawa (JP)

(72) Inventors: Kaori Toyama, Kanagawa (JP); Yuuki Yokohama, Kanagawa (JP); Hiromi Sakaguchi, Kanagawa (JP); Hideaki Nishimura, Kanagawa (JP); Masayuki Fukuoka, Tokyo (JP); Shuusuke Someno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 15/622,736

(22) Filed: Jun. 14, 2017

(65) Prior Publication Data

US 2017/0361632 A1 Dec. 21, 2017

(30) Foreign Application Priority Data

Jun. 15, 2016 (JP) ................... 2016-119269
Jul. 20, 2016 (JP) ................... 2016-142496
Mar. 17, 2017 (JP) ................... 2017-052672

(51) Int. Cl.

| | | |
|---|---|---|
| B41J 15/16 | (2006.01) |
| B41M 3/00 | (2006.01) |
| B41M 7/00 | (2006.01) |
| C09D 11/12 | (2006.01) |
| C09D 11/322 | (2014.01) |
| C09D 11/38 | (2014.01) |
| B41M 5/00 | (2006.01) |

(52) U.S. Cl.
CPC .............. *B41M 3/008* (2013.01); *B41J 15/16* (2013.01); *B41M 7/00* (2013.01); *C09D 11/12* (2013.01); *C09D 11/322* (2013.01); *C09D 11/38* (2013.01); *B41M 5/0023* (2013.01)

(58) Field of Classification Search
CPC ...... B41M 3/008; B41M 5/0023; B41M 7/00; B41J 15/16; C09D 11/12; C09D 11/322; C09D 11/38
See application file for complete search history.

(56) References Cited

U.S. PATENT DOCUMENTS

| | | | | |
|---|---|---|---|---|
| 2010/0165018 A1* | 7/2010 | Ooishi | ............... | B41J 29/393 347/7 |
| 2012/0320124 A1* | 12/2012 | Saito | ............... | C09D 11/326 347/21 |
| 2013/0293629 A1 | 11/2013 | Niino et al. | | |

FOREIGN PATENT DOCUMENTS

| | | |
|---|---|---|
| JP | 2010-155370 | 7/2010 |
| JP | 2012-045836 | 3/2012 |
| JP | 2013-248883 | 12/2013 |

\* cited by examiner

*Primary Examiner* — Thinh H Nguyen
(74) *Attorney, Agent, or Firm* — Oblon, McClelland, Maier & Neustadt, L.L.P.

(57) ABSTRACT

An image forming method includes applying an ink for the first time to a recording medium to form an image and rolling up the recording medium in a roll form, wherein the recording medium is continuous paper, the ink includes water, an organic solvent, and a coloring material, and the image has a tackiness power of from 80 to 110 nN.

18 Claims, 4 Drawing Sheets

INK, INKJET RECORDING METHOD, INK CARTRIDGE, AND IMAGE RECORDING DEVICE

CROSS-REFERENCE TO RELATED APPLICATIONS

This patent application is based on and claims priority pursuant to 35 U.S.C. § 119 to Japanese Patent Application Nos. 2016-119269, 2016-142496, and 2017-052672, filed on Jun. 15, 2016, Jul. 20, 2016, and Mar. 17, 2017, respectively, in the Japan Patent Office, the entire disclosures of which are hereby incorporated by reference herein.

BACKGROUND

Technical Field

The present disclosure relates to an image forming method, an image forming apparatus, and an image forming system.

Description of the Related Art

In inkjet recording methods, ink droplets are directly discharged from extremely fine nozzles to a recording medium to attach the ink droplets thereto to obtain texts and images.

Devices employing the inkjet method have advantages of less noises and good operability. Also, colorization is easy and plain paper can be used as the recording medium. For this reason, such devices are widely used at home and offices as the output device.

For industrial use, due to advancement of the inkjet technology, those devices are expected as output devices for digital printing. In fact, printers capable of recording on recording media having non-absorption property using solvent ink and UV ink have been launched. However, in terms of appealing for environment issues, aqueous ink has been demanded.

Aqueous ink for inkjet for plain paper and special paper such as photographic gloss paper has been developed for a long time. Also, expansion of use of inkjet recording methods is expected and needs for printing on coated paper is increasing. However, it is difficult to firmly fix a pigment on a medium such as coated paper having low permeability, which invites deterioration of abrasion resistance.

In an attempt to deal with this problem, an image forming apparatus capable of coating an ink layer with post-processing fluid for protection to secure fixability has been proposed.

SUMMARY

According to an embodiment of the present invention, provided are an improved image forming method, an improved image forming apparatus, and an improved image forming system. The image forming method includes applying an ink for the first time to a recording medium to form an image and rolling up the recording medium in a roll form, wherein the recording medium is continuous paper, the ink includes water, an organic solvent, and a coloring material, and the image has a tackiness power of from 80 to 110 nN.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Image Forming Method, Image Forming Apparatus, and Image Forming System

The image forming method of the present disclosure includes applying an ink for the first time to a recording medium to form an image, and rolling up the recording medium in a roll form, wherein the recording medium is continuous paper, wherein the ink includes water, an organic solvent, and a coloring material, wherein the image has a tackiness power of from 80 to 110 nN. The image forming method of the present disclosure is made based on the knowledge that typical image forming apparatuses have large-sized printer and are cost-expensive.

The present inventors have found the following:

Fixability as a conventional problem can be remedied by adding a resin emulsion to ink. However, resins capable of enhancing fixability have high elasticity, which leads to increase of tackiness power of the surface of an image if added. When the tackiness power increases, images may be detached (offset) at the time when a pressure is applied to the image portion, for example, when fixing the image portion using a fixing roller after image formation or when images are printed on roll paper and thereafter the roll paper is rolled up.

Figure 1:
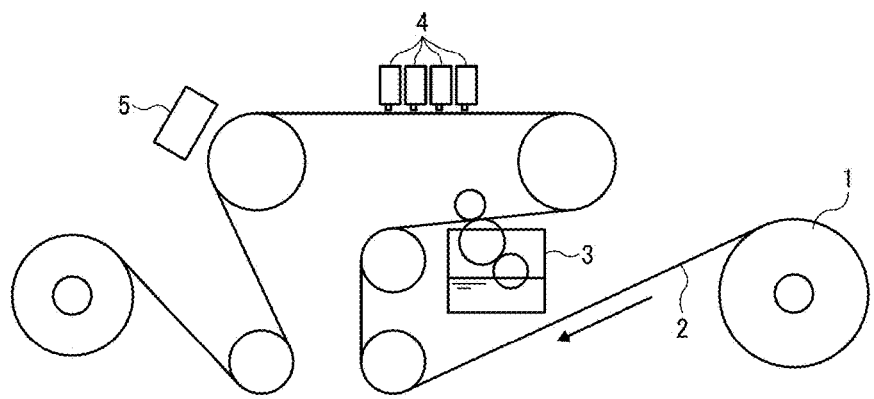
FIG. 1 is a schematic diagram illustrating an image forming apparatus using continuous paper according to an embodiment of the present invention.

In addition, if an image forming apparatus using the continuous paper as illustrated in FIG. 1 and including a sheet feeder 1, a recording medium 2, a pre-processing fluid applying unit 3, an ink discharging head 4, and a drying unit 5 is used, a large pressure is applied around the center of the roll and the image is detached in the process of rolling up the continuous paper after image recording. This is a widely-known large problem.

Moreover, when a tension is applied to the continuous paper to roll up the paper after recording, a large pressure is applied not only to around the center of the roll but also to the periphery of the roll. Therefore, the image may be detached. Furthermore, in the case of such continuous paper, after ink is applied to the surface of the continuous paper in the first ink applying process and the paper is rolled up, the ink is again applied to the same surface by the second ink applying process in some occasions, which is referred to as "additional printing". If the pressure applied during the rolling-up after the first recording is large, the paper is uniformly rolled up and the additional printing is beautifully done. However, as described above, image detachment may occur.

Conversely, when the pressure during the rolling-up after the first recording is small, the roll warps. As a result, non-uniform state occurs, which invites a misalignment problem of recording because the paper is not fed at a constant speed at the time of additional printing.

In terms of solving the problem described above, it is preferable that the second ink applying process be conducted to the side of a recording medium onto which the ink is jetted in the first ink applying process. However, it is also possible to apply the ink in the second process to the other side of the recording medium. In addition, in the present disclosure, it is possible to conduct other ink applying processes other than the first ink applying process (first recording) and the second ink applying process (second recording). Also, the ink applied for the first time is not necessarily different from the ink applied for the second time. Both can be the same ink.

The image forming apparatus of the present disclosure includes a recording medium, an ink-applying device to apply an ink to the recording medium to form images, a rolling-up device to roll up the recording medium in a roll form. The recording medium is continuous paper. The ink includes water, an organic solvent, and a coloring material. The image has a tackiness power of from 80 to 110 nN.

The image forming system of the present disclosure includes a recording medium, an ink-applying device to apply an ink to the recording medium to form images, a rolling-up device to roll up the recording medium in a roll form. The recording medium is continuous paper. The ink includes water, an organic solvent, and a coloring material. The image has a tack power of from 80 to 110 nN.

As another aspect of the present disclosure, the image forming method of the present disclosure includes applying an ink for the first time to a recording medium to form images and rolling up the recording medium in a roll form. The recording medium is continuous paper. The ink includes water, an organic solvent, and a coloring material. The image has a tackiness power of from 80 to 110 nN. The pressure is from 3.5 to 8.0 kg/cm$^2$.

Tackiness Power

The tackiness power of an image formed with the ink is from 80 to 110 nN and more preferably from 85 to 100 nN as measured with atom force microscope. When the tackiness power is 80 nN or greater, the binding power of the image is enhanced, the strength of film can be increased, and sufficient fixability is obtained. When the tackiness power is 110 nN or less, the power between the contact surface and a film when a pressure is applied to an image portion can adjust the film strength to maintain an image and prevent destruction of the image, thereby suppressing detachment of the image.

For example, the following method is utilized to calculate the tackiness power of the surface of an image.

Figure 2:
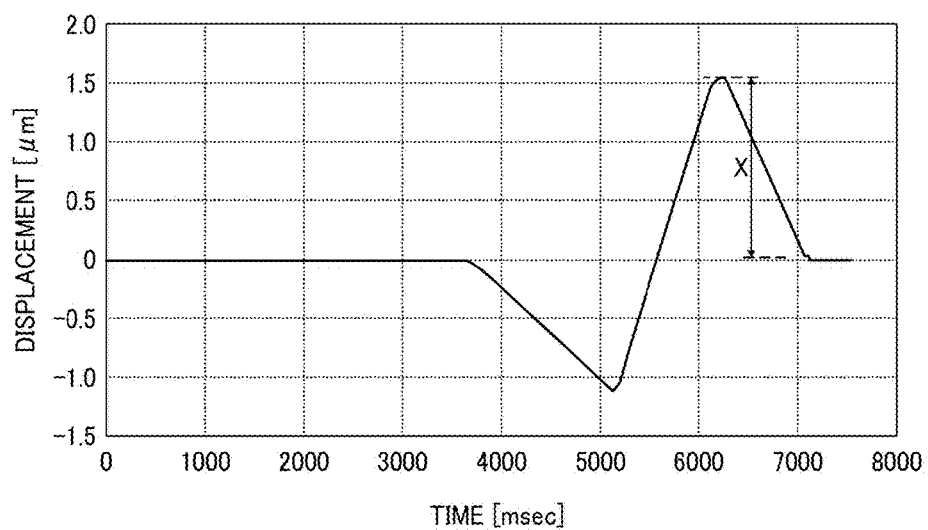
FIG. 2 is a graph illustrating a force curve obtained in the measuring of tackiness power of the surface of an image.
Figure 5:
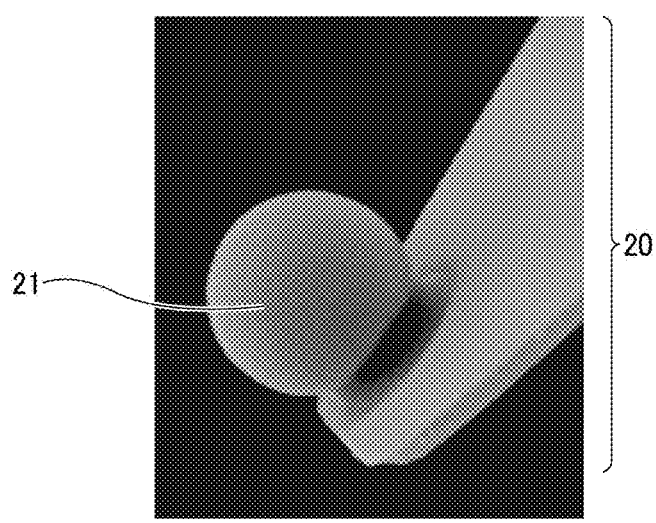
FIG. 5 is a photograph illustrating an example of a cantilever including a spherical probe as an atom force microscope.

In the method of measuring the tackiness power of the surface of an image, atom force microscope (AFM)(SPM-9500J3, manufactured by Shimadzu Corporation) is used. Various inkjet printers are used to output the image. The probe of the AFM is brought into contact with the image, pressed into a depth of 100 nm, and pulled up. The warp of the cantilever is monitored as the probe is detached from the image to obtain a force curve as illustrated in FIG. 2. The tackiness power F (=kx) is obtained by multiplying a displacement amount x by the spring constant k of a cantilever 20 illustrated in FIG. 5. The cantilever 20 includes a probe 21 made of a spherical silicone oxide. The measuring conditions are: measuring temperature of 23 degrees C., humidity of 35 percent RH, probe diameter of 3.5 µm, measuring mode of force curve measuring, and measuring frequency of 1 Hz.

Pressure Applied to Image

The pressure applied to the image is preferably from 3.5 to 8.0 kg/cm$^2$ and more preferably from 3.7 to 7.9 kg/cm$^2$. When the pressure is 3.5 kg/cm$^2$ or greater, images are sufficiently fixed and abrasion resistance is improved. When the pressure is 8.0 kg/cm$^2$ or less, images are prevented from being detached (offset) to a pressure roller, an overlapped image, and/or paper. There is no specific limitation to the measuring method of the pressure and can be selected among known devices to suit to a particular application. In addition, in the case in which the pressure in the pressure application process as described above occurs due to the rolling-up of the continuous paper after the ink is applied thereto, there is no particular limit to the measuring method and a suitable known device can be selected to suit to a particular application. For example, pressure pattern measuring system (I-SCAN, manufactured by NITTA Corporation) and a sensor sheet (I-SCAN#5027, manufactured by NITTA Corporation) can be used.

As to the pressure applied to the continuous paper having a roll form, for example, it is possible to make calculations referring to the diameter, the height, and the mass of the continuous paper having a roll form based on the photos and information thereof.

In the case in which the recording medium is continuous paper, the pressure preferably occurs when the continuous paper is rolled up after the ink is applied thereto. In the rolling-up process in which the continuous paper is rolled up by a rolling-up device, it is preferable that the pressure be applied to the image on the continuous paper by the tension occurring when the rolling-up device rolls-up the continuous paper. In the rolling-up process of rolling up the continuous paper, it is suitable that the pressure to the image be caused by the tension applied to the continuous paper.

With regard to the pressure in the pressure-applying process, in addition to the case in which the continuous paper is rolled up in a roll form, any pressure that can be applied to the recording medium is acceptable. The method can be active or passive. For example, one or more pressure rollers are used to apply a pressure to the recording medium.

When the one or more pressure rollers are used to press the recording medium, the pressure applied to the recording medium can be directly measured by, for example, a pressure pattern measuring system (I-SCAN, manufactured by NITTA Corporation) and a sensor sheet (I-SCAN#5027, manufactured by NITTA Corporation).

The pressure applying process may include one or more processes. Also, it is suitable that the pressure is partially or entirely applied to the recording medium. However, it is preferable that the pressure be applied to the entire of the recording medium.

In the present disclosure, when the tackiness power of an image is from 80 to 110 nN, blocking does not occur if a pressure of from 3.5 to 8.0 kg/cm$^2$ is applied after image forming. Also, it is possible to obtain an image with good fixability and excellent gloss.

If a pressure in the predetermined range is applied to the image having a tackiness power in the predetermined range, detachment of image does not occur and blocking resistance is good. Moreover, fixability of the image is improved and images with high gloss can be produced. Furthermore, in that pressure range, sufficient rolling-up pressure is applied so that additional printing can be conducted without a problem.

First Ink Application Process and Ink Application Device

In the first ink application process, ink is applied to a recording medium to form an image.

The ink application device is to apply ink to a recording medium to form an image.

The first ink application process is suitably conducted by the ink application device.

The tackiness of the surface of an image is particularly affected by the identifications of resins in ink. Details of the identification and addition amount of resins to realize the tackiness range are described later.

Ink

The ink includes water, an organic solvent, a coloring material, and other optional components based on a necessity basis.

Organic Solvent There is no specific limitation on the type of the organic solvent used in the present disclosure. For example, water-soluble organic solvents are suitable. Examples are polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, γ-caprolactam, and ε-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Not only to serve as a humectant but also impart a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

In particular, if a resin is used, N,N-dimethyl-β-buthoxypropionamide, N,N-dimethyl-β-ethoxypropionamide, 3-ethyl-3-hydroxymethyloxetane, and propylene glycol monomethylether are preferable. These can be used alone or in combination. Of these, amide solvents such as 3-buthoxy-N,N-dimethyl propionamide and 3-methoxy-N,N-dimethyl propionamide are particularly preferable to promote film-forming property of a resin and demonstrate better abrasion resistance.

The boiling point of the organic solvent is preferably from 180 to 250 degrees C. When the boiling point is 180 degrees C. or higher, the evaporation speed during drying can be suitably controlled, leveling is sufficiently conducted, surface roughness is reduced, and gloss is improved. Conversely, when the boiling point is higher than 250 degrees C., drying property is not good so that drying takes a longer time. According to the advancement of print technologies, the time to be taken for drying becomes a rate limiting factor. Therefore, it is required to shorten the drying time and naturally drying taking a long time is not preferable.

The proportion of the organic solvent in ink has no particular limit and can be suitably selected to suit to a particular application.

In terms of the drying property and discharging reliability of the ink, the proportion is preferably from 10 to 60 percent by mass and more preferably 20 to 60 percent by mass.

The proportion of the amide solvent in the ink is preferably from 0.05 to 10 percent by mass and more preferably from 0.1 to 5 percent by mass.

Coloring Material

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into the pigment to prepare a self-dispersible pigment, the surface of the pigment is coated with a resin followed by dispersion, or a dispersant is used to disperse the pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin may be dispersed in the ink unless the pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to select, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably 0.1 to 50 percent by mass and more preferably 0.1 to 30 percent by mass.

It is preferable that the pigment dispersion be filtered with a filter, a centrifuge, etc. to remove coarse particles and thereafter degassed.

Resin

The type of the resin contained in the ink has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring material and an organic solvent to obtain ink. The resin particle can be synthesized or is available on the market. These can be used alone or in combination.

Of these, it is preferable to use urethane resin particles in combination with other resin particles because the urethane resin particles have a large tackiness power, thereby degrading blocking resistance. However, due to the strength of tackiness power of the urethane resin particles, images are firmly formed so that fixability is improved. Furthermore, urethane resin particles having a glass transition temperature (Tg) of from −20 to 70 degrees C. have particularly great tackiness power when forming an image with ink so that fixability is further improved.

Moreover, of the resin particles mentioned above, acrylic resin particles are widely used because they are inexpensive and have good discharging stability. However, since abrasion resistance is inferior, it is preferable to mix the acrylic resin particle with the urethane resin particle, which has good flexibility.

The mass ratio (percent by mass) of the urethane resin particle to the acrylic resin particle is preferably from 0.03 to 0.7 and more preferably from 0.23 to 0.46. When the mass ratio (urethane resin particle to acrylic resin particle) is from 0.1 to 0.7, when the image formed using the ink is measured by an atomic force microscope (AFM), the tackiness power is within the range of from 80 to 110 nN in some cases. However, the ink constitution is not limited thereto.

When an ink attached film formed by ink having a mass ratio (urethane resin particle to acrylic resin particle) of from 0.03 to 0.7 is measured by Fourier Transform Infrared Spectroscopy (FT-IR), the area ratio (B/A) is preferably from 0.3 to 1.0, more preferably from 0.51 to 1.0, and particularly preferably from 0.6 to 1.0, where an area A in the area ratio (B/A) represents a peak region enclosed by a spectral region of from 692 cm$^{-1}$ to 707 cm$^{-1}$ and a straight line between the minimum point in a spectral region of 710 cm$^{-1}$ to 740 cm$^{-1}$ and the minimum point in a spectral region of 660 cm$^{-1}$ to 690 cm$^{-1}$ and B in the area ratio (B/A) represents a peak region enclosed by a spectral region of from 1,731 cm$^{-1}$ to 1,750 cm$^{-1}$ and a straight line between the minimum point in a spectral region of 1,660 cm$^{-1}$ to 1,690 cm$^{-1}$ and the minimum point in a spectral region of 1,760 cm$^{-1}$ to 1,790 cm$^{-1}$. When the area ratio (B/A) is from 0.3 to 1.0, there is no trade-off between improvement of abrasion resistance by urethane resin particles and improvement of blocking resistance by acrylic resin particle.

With regard to Fourier Transform Infrared Spectroscopy (FT-IR) for the ink attached film, attenated total reflection (ATR) method of Fourier Transform infrared spectrophotometer can be utilized. Specifically, the surface of an image formed on paper (Lumi Art Gloss, 130 gsm, manufactured by Stora Enso) in an attachment amount of ink of 1.12 mg/cm$^2$ (700 mg/A4) can be determined based on the spectra measured according to ATR method by diamond indenter, using Spectrum One (manufactured by PerkinElmer Japan Co., Ltd.).

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from to 30 percent by mass and more preferably from 5 to 20 percent by mass to the total content of the ink.

Examples of the acrylic resin particle are acrylic silicone resin particles and styrene-acrylic resin particles. These can be used alone or in combination. Of these, acrylic-silicone resin particles are preferable in terms of abrasion resistance.

Examples of the urethane resin particle are polycarbonate urethane resin particles, polyester urethane resin particles, and polyether urethane resin particles. These can be used alone or in combination. Of these, polycarbonate urethane resin particles are preferable in terms of abrasion resistance. The polycarbonate urethane resin particle has a polycarbonate backbone and includes polycarbonate-based urethane resin particle.

The glass transition temperature (Tg) of the urethane resin particle is preferably from −20 to 70 degrees C. When the glass transition temperature (Tg) is from −20 to 70 degrees C., tackiness power is high so that film-forming property is good. For this reason, good abrasion resistance is obtained.

The particle diameter of the solid portion in ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

There is no specific limitation to water and it can be suitably selected to suit to a particular application. Examples are deionized water, ultrafiltered water, reverse osmosis water, pure water such as distilled water, and ultra pure water. These can be used alone or in combination.

Additive Agent

Ink may further optionally contain a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples thereof include, but are not limited to, side-chain-modified polydimethylsiloxane, both-distal end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group is particularly preferable because such an agent demonstrates good characteristics as an aqueous surfactant. It is possible to use a polyether-modified silicone-based surfactant as the silicone-based surfactant. An example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application. Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

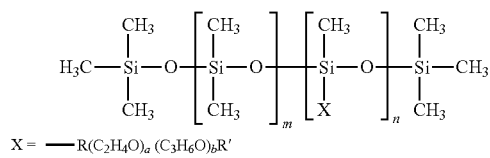

X = ——R(C$_2$H$_4$O)$_a$(C$_3$H$_6$O)$_b$R'

In the Chemical formula S-1, "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2-16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

CF$_3$CF$_2$(CF$_2$CF$_2$)$_m$—CH$_2$CH$_2$O(CH$_2$CH$_2$O)$_n$H  Chemical formula F-1

In the Chemical formula F-1, "m" is preferably 0 or an integer of from 1 to 10 and "n" is preferably 0 or an integer of from 1 to 40.

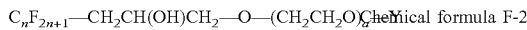
C$_n$F$_{2n+1}$—CH$_2$CH(OH)CH$_2$—O—(CH$_2$CH$_2$O)$_a$Y  Chemical formula F-2

In the compound represented by the chemical formula F-2, Y represents H or CnF$_{2n+1}$, where n represents an integer of 1-6, or CH$_2$CH(OH)CH$_2$—CnF$_{2n+1}$, where n represents an integer of 4-6, or CpH$_{2p+1}$, where p is an integer of 1-19, "a" represents an integer of 4-14.

As the fluorochemical surfactant, products available on the market may be used. Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably from 0.001 to 5 percent by mass and more preferably from 0.05 to 5 percent by mass in terms of enhancement of wettability and discharging stability and improvement on image quality.

Polyethylene Wax

Abrasion resistance is improved due to polyethylene wax contained in ink and the degree of gloss can be improved when used in combination with a resin.

Polyethylene wax is available on the market and specific examples include, but are not limited to, Aquapetro DP2502C (manufactured by TOYO ADL CORPORATION) and Aquapetro DP2401 (manufactured by TOYO ADL CORPORATION). These can be used alone or in combination.

The proportion of the polyethylene wax is preferably from 0.05 to 2 percent by mass, more preferably from 0.05 to 0.5 percent by mass, and furthermore preferably from 0.05 to 0.45 percent by mass, and particularly preferably from 0.15 to 0.45 percent by mass to the total content of ink. When the proportion is from 0.05 to 2 percent by mass, abrasion resistance and gloss are sufficiently improved. In addition, when the proportion is 0.45 percent by mass or less, storage stability and discharging stability of ink become good and such ink is suitable for inkjet use.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-one.

Corrosion Inhibitor

The corrosion inhibitor has not particular limitation. Examples are acid sulfites and sodium thiosulfates.

pH Regulator

The pH regulator has no particular limit. It is preferable to adjust the pH to 7 or higher. Specific examples include, but are not limited to, amines such as diethanol amine and triethanol amine The property of the ink is not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'×R24)

Sample liquid amount: 1.2 mL

Number of rotations: 50 rotations per minute (rpm)

degrees C.

Measuring time: three minutes

The surface tension of the ink is preferably 35 mN/m or less and more preferably 32 mN/m or less at 25 degrees C. in terms that the ink is suitably levelized on a recording medium and the drying time of the ink is shortened.

The pH of the ink is preferably from 7 to 12 and more preferably from 8 to 11 in terms of prevention of corrosion of metal materials including the ink.

Recording Medium

There is no specific limitation to the recording medium and it can be suitably selected to suit to a particular application. For example, plain paper, gloss paper, special paper, cloth, film, transparent sheets, print sheet for general purpose, etc. are suitable.

In particular, the recording medium suitable for the present disclosure includes a substrate, a coated layer provided on at least one surface of the substrate, and other optional other layers.

The recording medium including the substrate and the coated layer are generally referred to as coated paper and known as a medium having low permeability. It is difficult to firmly fix a coloring material to a medium having a low permeability such as coated paper so that abrasion resistance thereof is poor in most cases. However, as described above, if the tackiness power is from 80 to 110 nN, blocking does not occur under a pressure of from 3.5 to 8.0 kg/cm$^2$ after image forming. Also, images having high gloss are obtained, which is particularly preferable.

The recording medium including the substrate and the coated layer preferably has a transfer amount of pure water to the recording medium is preferably from 2 to 35 ml/m$^2$ and more preferably from 2 to 10 ml/m$^2$ during a contact time of 100 ms as measured by a liquid dynamic absorption tester.

When the transfer amount of the ink and pure water during a contact time of 100 ms is too small, beading tends to occur. When the transfer amount is too large, the ink dot diameter after recording tends to be smaller than desired.

The recording medium preferably has a transfer amount of pure water to the recording medium as measured by a liquid dynamic absorption tester is preferably from 3 to 40 ml/m$^2$ and more preferably from 3 to 10 ml/m$^3$ during a contact time of 400 ms.

When the transfer amount of pure water during a contact time of 400 ms is too small, the drying property tends to deteriorate, resulting in occurrence of spur marks. When the transfer amount of pure water during a contact time of 400 ms is too large, the gloss of the image portion after drying tends to be low. The transfer amount of pure water to the recording medium during a contact time of 100 ms and 400 ms can be measured at the surface on which the coated layer is provided in both cases.

This dynamic scanning absorptometer (Kuga, Shigenori, Dynamic scanning absorpmenter (DSA); Journal of JAPAN TAPPI, published in May 1994, Vol. 48, pp. 88-92) can accurately measure the imbibition liquid amount in an extremely small time period. Measuring is automated in this dynamic scanning absorptometer by the method of directly reading the absorption speed of liquid from moving of meniscus in a capillary and spirally scanning a sample having a disc-like form with an imbibition head, while automatically changing the scanning speed according to predetermined patterns to measure the necessary number of points of the single sample.

The liquid supply head to the paper sample is connected to the capillary via a TEFLON® tube and the position of the meniscus in the capillary is automatically read by an optical sensor. Specifically, the transfer amount of pure water or ink can be measured using a dynamic scanning absorptometer (K350 Series D type, manufactured by Kyowa Seiko Inc.). Each of the transfer amount during the contact time of 100 ms and 400 ms can be obtained by interpolation from the measuring results of the transfer amount in the proximity contact time of the contact time.

Substrate

There is no specific limitation to the selection of the substrate and it can be suitably selected to suit to a particular application. For example, paper mainly formed of wood fiber and a sheet material such as non-woven cloth mainly formed of wood fiber and synthesized fiber.

There is no specific limit to the selection of the paper. Any known paper can suitably be selected for use. For example, wood pulp and wood pulp and waste paper pulp are used.

Specific examples of the wood pulp include, but are not limited to, L-Breached Kraft Pulp (LBKP), N-Breached Kraft Pulp, N-Breached Sulfite Pulp (NBSP), L-Breached Sulfite Pulp (LBSP), Ground Pulp (GP), and Thermo-Mechanical Pulp (TMP).

Specific examples of the materials for the waste paper pulp include, but are not limited to, {waste paper (broke) of} high quality white paper without print, {waste paper (broke) of} lined white paper without print, {waste paper (broke) of} high quality cream paper without print, {waste paper (broke) of} cardboard, {waste paper (broke) of} medium quality paper without print, (waste paper of) white paper with black print, {waste paper (broke) of} woody paper without print, (waste paper of) white paper with color print, (waste paper of) white paper or art paper with color print, {waste paper (broke) of} art paper without print, (waste paper of) medium quality paper with color print, (waste paper of) woody paper with print, waste paper of newspaper, waste paper of magazine, etc. specified in the waste paper quality specification list by Paper Recycling Promotion Center.

To be specific, these are chemical pulp paper and high-yield pulp containing paper, which are waste paper of paper and paper board paper such as print paper such as non-coated computer paper, thermal paper, and pressure-sensitive paper, OA waste paper such as plain photocopying paper; coated paper such as art paper, coated paper, micro-coated paper, and matt coated paper; non-coated paper such as high-quality paper, high quality colored paper, note, letter paper, package paper, cover paper, medium quality paper, newsprint paper, woody paper, super wrapping paper, imitation Japanese vellum, machine glazed poster paper, and polyethylene-coated paper (milk carton paper).

These can be used alone or in combination.

The waste paper pulp can be manufactured by a combination of the following four processes:

(1): In defiberization, waste paper is subjected to mechanical force and drugs by a pulper to make unstiffened fiber, from which the printed ink is detached.

(2): In dust removal, foreign objects such as plastic contained in waste paper and dirt are removed by a screen, a cleaner, etc.

(3): In removal of ink, the printed ink detached from the fiber by using a surfactant is removed outside the system by a flotation method or a washing method.

(4) In bleaching, the degree of white is improved using oxidation and reduction.

When the waste paper pulp is mixed, the mixing ratio of the waste paper pulp in all the pulp is preferably 40 percent or less considering curling after recording.

As the internal loading material for use in the substrate, for example, known pigments are used as white pigment.

Specific examples of the white pigments include, but are not limited to, inorganic white pigments such as light calcium carbonate, heavy calcium carbonate, kaolin, clay, tulc, calcium sulfate, barium sulfate, titanium dioxide, zinc oxide, zinc sulfide, zinc carbonate, satin white, aluminum silicate, diatom earth, calcium sillicate, magnesium silicate, synthesized silica, aluminum hydroxide, alumina, lithopone, zeolite, magnesium carbonate, and magnesium hydroxide: organic pigments such as styrene-based plastic pigment, acrylic-based plastic pigments, polyethylene, microcapsule, urea resin, and melamine resins. These can be used alone or in combination.

As the internal sizing agents for use in sheet-making the substrate, for example, neutral rosin-based sizing agents, alkenyl succinic anhydride (ASA), alkyl ketene dimer (AKD), and petroleum resin sizing agents for use in neutral paper-making are used. Of these, neutral rosin sizing agents and alkenyl succinic anhydride are particularly preferable. The alkyl ketene dimers have an excellent sizing effect, meaning that the addition amount is less. However, it reduces the friction index of the surface of a recording medium so that the recording medium tends to become too smooth (slippery), which is not preferable in terms of conveyance during inkjet recording.

Coated Layer

The coated layer comprises a pigment, a binder (binding agent), and optionally a surfactant and other components. The coated layer in the present disclosure contains a pigment and a binder (binding agent) as described above and it does not matter whether actually coated or not, etc.

As the pigments, inorganic pigments or a combination of inorganic pigments and organic pigments can be used.

Specific examples of the inorganic pigments include, but are not limited to, kaolin, tulc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite. Of these, kaolin has an excellent gloss demonstration and is particularly preferable to make the texture close to that of off-set printing paper.

Kaolin includes delaminated kaolin, baked kaolin, and engineered kaolin by surface-remodeling. Considering the gloss demonstration, kaolin having a particle size distribution in which particles having a particle diameter of 2 μm or less accounts for 80 percent by mass or more preferably accounts for 50 percent by mass of the total of kaolin.

The proportion of kaolin is preferably 50 parts by mass or more to 100 parts by mass of the binder resin. When the proportion is 50 parts by mass or more, gloss can be improved. Although there is no specific upper limit to the proportion. Taking into account fluidity, in particular, thickening under a high shearing force, the proportion of kaolin is 90 parts by mass or less in terms of coating suitability.

Specific examples of the organic pigments include, but are not limited to, water-soluble dispersions of styrene-acrylic copolymer particles, styrene-butadien copolymer particles, polystyrene particles, and polyethylene particles. These can be used alone or in combination.

The proportion of the organic pigment is preferably from 2 to 20 parts by mass to 100 parts by mass of all of the pigments in the coated layer. Since the organic pigments have excellent gloss demonstration, the specific gravity thereof is smaller than that of an inorganic pigment, it is possible to obtain a bulky coated layer having a high gloss with good surface covering property. When the content is 2 parts by mass or greater, the above-mentioned effect demonstrates and when the content is 20 parts by mass or less, flowability of liquid application is excellent, thereby improving coating operability, which is cost effective and economical.

The organic pigments are classified into solid type, hollow type, doughnut type, etc. Considering the balance of the demonstration of gloss, surface coverage property, and flowability of a liquid application, the average particle diameter of the organic pigment is preferably from 0.2 μm to 3.0 μm and more preferably a hollow type having a void ratio of 40 percent or more.

As the binder resin, aqueous resins are preferable.

As the aqueous resins, at least one of water-soluble resins and water-dispersible resins are preferable.

There is no specific limit to the water-soluble resins and any known water-soluble resins can be suitably used.

Specific examples thereof include, but are not limited to, polyvinyl alcohol, modified polyvinyl alcohols such as anion-modified polyvinyl alcohol, cation-modified polyvinyl alcohol, and acetal-modified polyvinyl alcohol; polyurethane; polyvinyl pyrolidone and modified polyvinyl pyrolidones such as copolymers of polyvinyl pyrolidone and vinyl acetate, copolymers of vinyl pyrolidone and dimethyl aminoethyl methacrylic acid; copolymers of quaternarized vinyl pyrolidone and dimethyl aminoethyl methacrylic acid; and copolymers of vinyl pyrolidone and methacrylic amide propyl trimethyl ammonium chloride; celluloses such as carboxymethyl cellulose, hydroxyethyl cellulose, and hydroxy propyl cellulose; modified celluloses such as cationized hydroxyethyl cellulose; synthetic resins such as polyesters, polyacrylates, melamine resins, their modified products, and copolymers of polyesters and polyurethane; poly(meth)acrylic resins, poly(meth)acrylic amides, oxidized starch, phosphate starch, self-modified starch, cationized starch, other modified starches, polyethylene oxide, sodium polyacrylates, and sodium alginate. These can be used alone or in combination.

Of these, in terms of ink absorbing, polyvinyl alcohol, cation-modified polyvinyl alcohol, acetal-modified polyvinyl alcohol, polyesters, polyurethanes, and copolymers of polyester and polyurethane are particularly preferable.

There is no specific limit to the water-dispersible resins and any known water-dispersible resin can be suitably used.

Specific examples thereof include, but are not limited to, polyvinyl acetate, copolymers of ethylene and vinyl acetate, polystyrene, copolymers of styrene and (meth)acrylate, (meth)acrylate polymers, copolymers of vinyl acetate and (meth)acrylate, styrene and butadiene copolymers, ethylene and propylene copolymers, polyvinyl ethers, silicone and acrylic copolymers. In addition, optionally, a cross-linking agents such as methylolated melamine, methylolated urea, methylolated hydroxy propylene urea, and isocyanate can be added. Copolymers having a self-cross-linking property that includes a unit such as N-methylol acrylic amide are also suitable. These aqueous resins cane be use alone or in combination.

The content of the aqueous resin is preferably from 2 to 100 parts by mass and more preferably from 3 to 50 parts by mass to 100 parts by mass of a pigment. The content is determined in order for the recording medium to have a target liquid absorption property.

When a water-dispersible coloring agent is used as the coloring agent, it is not necessary to blend with the cationic organic compound and there is no specific limit to the cationic organic compound and it can be suitably selected to suit to a particular application. For example, monomers, oligomers, and polymers of primary to tertiary amines and quarternary ammonium salts that form insoluble salts through reaction with a sulfonic acid group, a carboxylic group, an amino group, etc in a direct dye or an acidic dye in a water-soluble ink are preferable. Of these, oligomers and polymers are preferable.

Specific examples of the cationic organic compounds include, but are not limited to, dimethyl amine epichlorohydrin condensation compounds, dimethyl amine ammonium epichlorohydrin condensation compounds, poly(methacrylic acid trimethyl aminoethyl ● methyl sulfate), copolymers of diallylamine chloride ● acrylic amide, poly (diallylamine chloride ● sulfur dioxide), polyallyl amine chloride, poly(allylamine chloride● diallylamine chloride), copolymers of acrylic amide ● diallyl amine, polyvinyl amine copolymers, dicyane diamde, dicyane diamide● ammonium chloride ● urea ● formaldehyde condensation compound, polyalkylene polyamine● dicyane diamide ammonium salt condensation product, dimethyldiallyl ammonium chloride, polydiallylmethyl amine chloride, poly (diallyldimethyl ammonium chloride), poly(diallyldimethyl ammonium chloride● sulfur dioxide), poly(diallyldimethylammonium chloride ● diallyl amine chloride derivatives), arcylic amide ● diallyl dimethyl ammonium chloride copolymers, acrylate● acrylic amide ● diallyl amine chloride copolymers, polyethylne imine, ethylene imine derivatives of acrylic amine polymers, etc., and modified polyethylene imine alkylene oxides. These can be used alone or in combination.

Of these, it is preferable to use a dimethyl amine epichlorohydrin condensation compound, a cationic organic compound having a low molecular weight such as polyallyl amine chloride, and another cationic organic compound having relatively high molecular weight such as poly(diallyldimethyl ammonium chloride) in combination. In such a combinational use, image density is improved more than a single use of such a cationic organic compound, thereby reducing feathering.

The cation equivalent of the cationic organic compound by the colloid titration method (using polyvinyl potassium sulfate and toluidine blue) is preferably from 3 to 8 meq/g. When the cationic equivalent is within this range, good results are obtained within the range of the dry attachment amount.

When the cation equivalent is measured by the colloid titration method, the cationic organic compound is diluted by distilled water such that the solid portion accounts for 0.1 percent by mass and pH is not adjusted.

The drying attachment amount of the cationic organic compounds is preferably from 0.3 to 2.0 $g/m^2$. When the drying attachment amount is 0.3 $g/m^2$ or greater, image density is improved and feathering is reduced.

There is no specific limit to the surfactant and it can be suitably selected to suit to a particular application. The surfactant can be any of anionic surfactants, cationic surfactants, amphoteric surfactants, and non-ionic surfactants. Of these, non-ionic surfactants are particularly preferred. When the surfactant is added, water resistance of an image is improved and the image density becomes high, thereby reducing the bleeding.

Specific examples of the nonionic surfactants include, but are not limited to, adducts of higher alcohol with ethylene oxides, adducts of alkyl phenol with ethylene oxides, adducts of aliphatic acid with ethylene oxide, adducts of aliphatic acid with ethylene oxide, adducts of polyol aliphatic ester with ethylene oxide, adducts of higher aliphatic acid amine with ethylene oxide, adducts of aliphatic acid amide ethylene oxide, adducts of fat with ethylene oxide, adducts of polypropylene glycol with ethylene oxide, aliphatic acid esters of glycerol, aliphatic acid esters of pentaerythritol, aliphatic acid esters of sorbitol and sorbitane, aliphatic acid esters of sucrose, alkyl ethers of polyol, and aliphatic acid amides of alkanol amines.

These can be used alone or in combination.

There is no specific limit to the polyol and any known polyol is suitably used.

Specific examples thereof include, but are not limited to, glycerol, trimethylol propane, pentaerythritol, sorbitol, and sucrose.

In addition, with regard to the adducts of ethylene oxide, it is also suitable to use adducts in which part of ethylene oxide is substituted with alkylene oxides such as propylene oxide or butylene oxide as long as water-solubility is maintained. Preferably, the substitution ratio is 50 percent or less.

The HLB (hydrophilicity/lipophilicity) of the non-ionic surfactant is preferably from 4 to 15 and more preferably from 7 to 13.

The addition amount of the surfactant is preferably from 0 to 10 parts by mass and more preferably from 0.1 to 1.0 part by mass based on 100 parts by mass of the cationic organic compound.

Other components can be optionally added to the coated layer in a range in which the objective and effect of the present invention are not spoiled. As the other components, aluminum powder, pH regulators, corrosion inhibitors, and anti-oxidizing agents are preferable.

There is no specific limit to the method of forming the coated layer. For example, methods are used in which liquid application for the coated layer is applied to the substrate or the substrate is immersed therein. There is no specific limit to the method of immersion in or application (coating) of the liquid application for the coated layer. For example, the liquid can be coated by a conventional size pressing machine, a gate roll size pressing machine, a film transfer size pressing machine, a blade coater, a rod coater, an air knife coater, and a curtain coater. In terms of the cost, the substrate is immersed in the liquid or the liquid is applied by a conventional size pressing machine, a gate roll size pressing machine, a film transfer size pressing machine, etc. installed onto a paper machine first followed by finishing using an on-machine coater.

There is no specific limit to the attachment amount of the liquid application. The attachment amount preferably ranges from 0.5 to 20 g/m$^2$ and more preferably from 1 to 15 g/m$^2$ in solid form.

The coated layer can be optionally dried after immersion or application (coating). There is no specific limit to the drying temperature and it can be suitably selected to suit to a particular application. Preferably, the drying temperature ranges from about 100 to 250 degrees C.

The recording medium may have a rear layer on the rear side of the substrate and/or another layer formed between the substrate and the coated layer and/or the rear layer and the substrate. Also a protection layer can be formed on the coated layer.

Each layer may employ a single layer structure or multilayer structure.

Pressure Applying Step and Pressure Applying Device

The pressure applying process is to apply a pressure to an image obtained in the first ink applying process.

The pressure applying device is to apply a pressure to an image obtained by the first ink applying device.

In addition, the pressure applying process can be suitably conducted by the pressure applying device.

As the pressure, it is preferable that a pressure arise when the continuous paper is rolled up after the ink is applied.

In addition to the pressure occurring when continuous paper overlaps as describe above, a pressure occurs when cut sheets are laminated, when continuous paper or cut sheets are cut, and when rollers to ameliorate fixability after recording or rollers to apply post-processing fluid are installed. The pressure to an image in the pressure applying process includes such pressures.

Rolling-Up Process and Rolling-Up Device

The rolling-up process is to roll up the recording medium onto which the ink is applied in a roll manner.

The rolling-up device is to roll up the recording medium onto which the ink is applied in a roll form.

The rolling-up process can be suitably conducted by the rolling-up device.

There is no specific limit to the rolling-up device and it can be suitably selected to suit to a particular application. For example, Rewinding module RW6 (manufactured by Hunkeler) can be used.

Method of Manufacturing Continuous Paper Having Image Thereon

A method of manufacturing continuous paper having an image thereon is to manufacture continuous paper rolled up in a roll form and includes applying ink for the first time to a recording medium to form an image thereon and rolling up the recording medium onto which the ink is applied in a roll form. The recording medium is continuous paper. The ink includes water, an organic solvent, and a coloring material. The image has a tackiness power of from 80 to 110 nN. A pressure is applied to the image during the rolling-up process.

This ink applying process for the first time can be the same as the ink applying process for the first time in the image forming method.

This rolling-up process can be the same as the rolling-up process in the image forming method.

The image forming method, the image forming apparatus, the image forming system, and the method of manufacturing continuous paper having images thereon relating to the present disclosure are described with reference to drawings. The image forming system is defined based on a concept of including the entire of multiple apparatuses including devices constituting the present disclosure, each of which is present in one or more of the multiple apparatuses. For example, this concept includes the case in which the first ink applying device and the pressure applying device are present in separate apparatuses. Also, the continuous paper is a recording medium which is continuously present along the conveying direction at the time of image forming.

The continuous paper includes, for example, roll paper rolled in a roll form and continuous paper folded by a regular length. It is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

Figure 3:
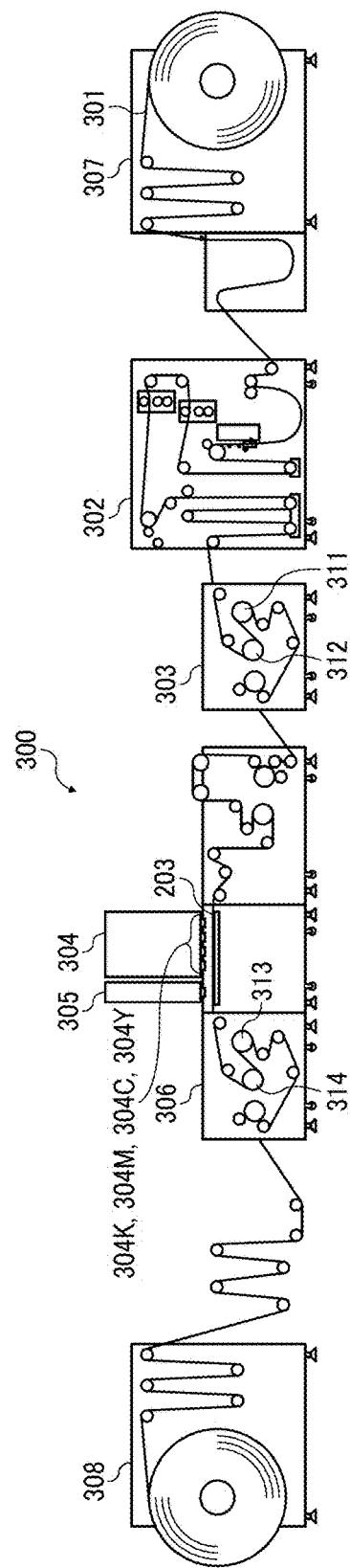
FIG. 3 is a schematic diagram illustrating an inkjet recording device as an example of the image forming apparatus according to an embodiment of the present disclosure.

FIG. 3 is a diagram illustrating the inkjet recording device as an example of the image forming apparatus according to an embodiment of the present disclosure. An inkjet recording device 300 to which the present disclosure is applied includes a recording medium conveying unit 301, a pre-processing unit 302 to apply a pre-processing fluid to a recording medium (continuous paper) 203, a post-pre-processing drying unit 303 to dry the recording medium 203 to which the pre-processing fluid is applied, an image forming processing unit (head unit) 304 to form an image on the recording medium 203, a post-processing unit (post-processing fluid supplying device) 305 to apply a post-processing fluid to the recording medium 203 after the image is formed thereon, and a post-post-processing drying unit 306 to dry the recording medium 203 to which the post-processing fluid is applied.

A recording medium conveying unit 301 includes a sheet feeder 307, multiple conveying rollers, and a rolling-up unit 308. The recording medium 203 is continuous roll paper, reeled out from the sheet feeder 307 by the conveying rollers, transferred along on a platen glass, and rolled up by a rolling-up device.

The recording medium 203 conveyed from the recording medium conveying unit 301 is coated with the pre-processing fluid at the pre-processing unit 302 of FIG. 3. If an image is formed on a recording medium other than a special inkjet sheet, quality problems arise about feathering, density, coloring, strike-through, etc. and image durability problems about water-proof, weatherability, etc. To solve these problems, a pre-processing fluid having a feature of agglomerating ink is applied to a recording medium to improve the image quality.

In the pre-processing process, the pre-processing fluid is evenly applied to the surface of a recording medium. There is no specific limit to the selection to a method applying the pre-processing fluid.

Specific examples of such methods include but are not limited, blade coating method, gravure coating method, gravure offset coating method, a bar coating method, roll coating method, knife coating method, air knife coating method, comma coating method, U comma coating method, AKKU coating method, smoothing coating method, microgravure coating method, reverse roll coating method, four or five roll coating method, dip coating method, curtain coating method, slide coating method, and die coating method.

A post-pre-processing drying unit 303 can be provided to the pre-processing unit 302 after the application process. The post-pre-processing fluid drying unit 303 includes, for example, heat rollers 311 and 312. This unit conveys the recording medium 203 onto which the pre-processing fluid is applied to the heat rollers 311 and 312. The heat rollers 313 and 314 are heated to high temperatures of from 50 to 100 degrees C. Moisture of the recording medium 203 onto which the pre-processing fluid is applied evaporates by contact heat transfer from the heat rollers 313 and 314 so that the recording medium 203 becomes dry.

Figure 4:
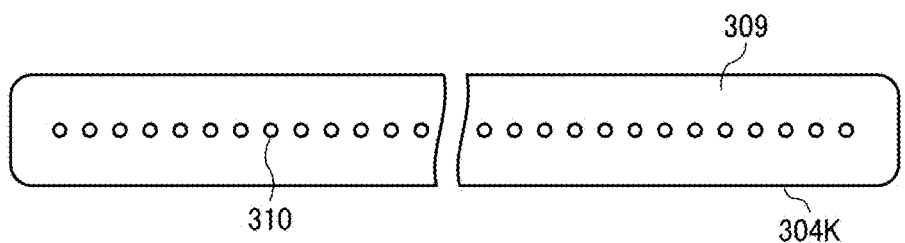
FIG. 4 is an enlarged diagram illustrating the head unit illustrated in FIG. 3.

FIG. 4 is an enlarged diagram illustrating a recording head 304K of the image forming processing unit 304 illustrated in FIG. 3. As illustrated in FIG. 4, a nozzle surface 309 of the recording head 304K has multiple print nozzles 310 arranged along the longitudinal direction of the image forming processing unit 304 to form a nozzle line. In this embodiment, there is only one nozzle line but multiple nozzle lines can be also arranged. In addition, the image forming processing unit 304 in an embodiment of the present disclosure includes other recording heads 304C, 304M, and 304Y in addition to 304K.

The other recording heads 304C, 304M, and 304Y have the same configurations as the recording head 304K and the four recording heads 304K, 304C, 304M, and 304Y are disposed along the conveying direction spaced the same gap therebetween. Therefore, an image can be formed on the entire printing area width by a single image forming operation.

The post-processing fluid is optionally applied to the recording medium 203 at the post-processing unit 305 after image forming. The post-processing fluid contains a component capable of forming a transparent protection layer on the recording medium 203.

In the post-processing process in this embodiment, the post-processing fluid is applied only to a particular portion in the image forming area of the recording medium. The optimal application amount is preferably determined depending on the color of ink. It is more preferable to change the application amount and the application method depending on the kind of recording media and resolution.

The method of applying this post processing fluid is not particularly limited and can be suitably selected depending on the kind of the post processing fluid. It is possible to utilize the same method as the application method of the pre-processing fluid or the method of jetting ink for inkjet. Of these, it is particularly preferable to utilize the same method as the method of jetting ink for inkjet in terms of the configuration of a device and storage stability of the post processing fluid. In this post-processing process, a post processing fluid containing a transparent resin is applied to the surface of an image in such a manner that the dried attachment amount is from 0.5 to 10 g/m$^2$ to form a protection layer.

The post-post-processing drying unit 306 includes, for example, heat rollers 313 and 314 as illustrated in FIG. 3. This unit conveys the recording medium 203 onto which the post-processing fluid is applied to the heat rollers 313 and 314. The heat rollers 313 and 314 are heated to high temperatures. Moisture of the recording medium 203 onto which the post-processing fluid is applied evaporates by contact heat transfer from the heat rollers 313 and 314 so that the recording medium 203 becomes dry. The drying device is not limited to those. For examples, an infra red drier, a microwave drier, and a hot air device can be used. These can be used in combination of, for example, a heat roller and a hot air device.

The terms of image forming, recording, and printing in the present disclosure represent the same meaning.

Also, recording media, media, substrates in the present disclosure have the same meaning.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

Tackiness power of images and the area ratio (B/A) of the images used in the following Examples and Comparative Examples were measured as follows.

Tackiness Power

The tackiness power of images were measured by using atom force microscope (AFM)(SPM-9500J3, manufactured by Shimadzu Corporation). At the time of measuring, a cantilever (spring constant: 0.29 N/m) including spherical silicone oxide as probe was used. In addition, the image for use in the measuring was a solid image on paper (Lumi Art Gloss, 90 gsm or 200 gsm, manufactured by Stora Enso) recorded by an inkjet printing system (RICOH Pro VC60000, manufactured by Ricoh Company Ltd.) under the conditions of 1,200 dpi and a printing speed of 50 m/min.

Area Ratio (B/A)

An image having an ink attachment amount of 1.12 mg/cm$^2$ (700 mg/A4) was formed on paper (Lumi Art Gloss, 130 gsm, manufactured by Store Enso). The area ratio (B/A) was determined based on the spectra measured according to Attenated Total Reflection (ATR) by using Fourier Transform Infrared Spectrometer (FT-IR). Specifically, it was determined based on the spectra measured according to ATR method by diamond indenter, using Spectrum One (manufactured by PerkinElmer Japan Co., Ltd.).

Preparation Example 1 of Pigment Dispersion

Preparation of Cyan Pigment Dispersion 20 g of Pigment Blue 15:3 (CHROMOFINE BLUE, manufactured by Dainichiseika Color & Chemicals Mfg. Co., Ltd.), 20 mmol of the compound represented by the following Chemical formula 1 illustrated below, and 200 mL of deionized highly pure water were mixed at room temperature using a Silverson Mixer (6,000 rpm) to obtain a slurry. When an obtained slurry has a pH higher than 4, 20 mmol of nitric acid was added. 30 minutes later, 20 mmol of sodium nitrite dissolved in a minute amount of deionized highly pure water was slowly added to the mixture. Furthermore, the temperature was raised to 60 degrees C. while being stirred to conduct reaction for one hour. A reformed pigment can be produced in which the compound represented by Chemical Formula 1 illustrated below was added to Pigment Blue. Thereafter, by adjusting the pH to be 10 by NaOH aqueous solution, a reformed pigment dispersion was obtained 30 minutes later.

The reformed pigment dispersion containing a pigment bonded with at least one geminalbis phosphonic acid group or a sodium salt of geminalbis phosphonic acid and deionized highly pure water were subject to ultrafiltration using dialysis membrane followed by ultrasonic dispersion to obtain a cyan pigment dispersion having a pigment concentration of 15 percent by mass.

Chemical formula 1

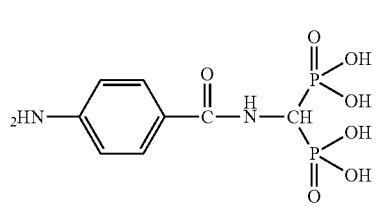

Preparation Example 2 of Pigment Dispersion

Preparation of Magenta Pigment Dispersion

A magenta pigment dispersion having a pigment concentration of 15 percent by mass was obtained in the same manner as in Preparation Example 1 of Pigment Dispersion except that 20 g of Pigment Blue 15:3 was changed to 20 g of Pigment Red 122 (Toner Magenta E002, manufactured by Clariant Japan KK).

Preparation Example 1 of Ink

Preparation of Ink 1

The following recipe was mixed and stirred followed by filtration using polypropylene filter (Profile Star, manufactured by NIHON PALL LTD.) having an average opening diameter of 1.5 μm to obtain Ink 1.

| | |
|---|---|
| Cyan pigment dispersion | 15.0 percent by mass |
| N,N,-dimethyl-β-buthoxypropionamide (B100, boiling point: 252 degrees C., manufactured by Idemitsu Kosan Co., Ltd.) represented by the following Chemical formula 2: | 5.0 percent by mass |
| 3-ethyl-3-hydroxymethyloxetane (EHO, boiling point: 227 degrees C., manufactured by Ube Industries, Ltd.) represented by the following Chemical formula 3: | 3.0 percent by mass |
| 1,3-propane diol (boiling point: 214 degrees C., manufactured by Tokyo Chemical Industry Co. Ltd.) | 22.0 percent by mass |
| 1,2-propane diol (boiling point: 188 degrees C., manufactured by ADEKA CORPORATION): | 16.0 percent by mass |
| Polycarbonat-based urethane resin particle 1 (TAKELAC™ W6110, glass transition temperature: −20 degrees C., manufactured by Mitsui Chemicals, Inc.): | 5.0 percent by mass |
| Acrylic silicone resin particle (SYMAC® US480, manufactured by TOAGOSEI CO., LTD.): | 11.0 percent by mass |
| Polyether-modified siloxane surfactant (TEGO Wet270, manufactured by Evonik Industries AG): | 2.0 percent by mass |
| Water added to make the total 100 percent by mass | |

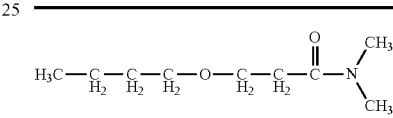

Chemical formula 2

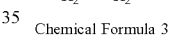

Chemical Formula 3

Preparation Examples 2 to 13 of Ink

Preparation of Inks 2 to 13

Inks 2 to 13 were obtained in the same manner as in Preparation Example 1 of Ink except that the composition was changed to those shown in Tables 1 and 2.

TABLE 1

| | | Ink | | | | | |
|---|---|---|---|---|---|---|---|
| | | 1 | 2 | 3 | 4 | 5 | 6 |
| Coloring material | Cyan pigment dispersion | 15.0 | 15.0 | 15.0 | 15.0 | 15.0 | 15.0 |
| | Magenta pigment dispersion | — | — | — | — | — | — |
| Organic solvent | N,N-dimethyl-β-buthoxy propionamide | 5.0 | 5.0 | — | — | 3.0 | 3.0 |
| | 3-ethyl-3-hydroxymethyl oxetane | 3.0 | — | 3.0 | 4.0 | 2.0 | 3.0 |
| | 1,2-butane diol | — | — | 20.0 | 21.0 | 5.0 | — |
| | N,N-dimethyl-β-ethoxy propionamide | — | — | — | — | — | — |
| | 1,3-butane diol | — | — | — | — | — | — |
| | 1,3-propanediol | 22.0 | 23.0 | — | — | — | 3.0 |
| | 1,2-propanediol | 16.0 | 14.0 | 13.0 | 16.0 | 16.0 | 16.0 |
| | 1-methoxy-2-propanol | — | — | — | — | — | — |
| Resin | Urethane resin particle | Polycarbonate-based urethane resin particle 1 | 5.0 | 0.5 | — | 3.0 | 1.0 | 2.0 |

TABLE 1-continued

|  |  | Ink |  |  |  |  |  |
|---|---|---|---|---|---|---|---|
|  |  | 1 | 2 | 3 | 4 | 5 | 6 |
|  | Polycarbonate-based urethane resin particle 2 | — | — | 16.0 | — | — | — |
|  | Polyether-based urethane resin particle | — | — | — | — | — | — |
|  | Polycarbonate-based urethane resin particle 3 | — | — | — | — | — | — |
| Acrylic resin particle | Acrylic silicone resin particle | 11.0 | 18.0 | — | 13.0 | 18.0 | 15.0 |
|  | Styrene acrylic resin particle | — | — | — | — | — | — |
| Surfactant | Polyether-modified siloxane surfactant | 2.0 | 2.0 | 2.0 | 2.0 | 2.0 | 2.0 |
|  | Nonionic surfactant | — | — | — | — | — | — |
| Wax | Polyethylene wax | — | — | — | — | — | — |
|  | Water | Rest | Rest | Rest | Rest | Rest | Rest |
|  | Total (Percent by mass) | 100 | 100 | 100 | 100 | 100 | 100 |
|  | Mass ratio (urethane resin particle/acrylic resin particle) | 0.46 | 0.03 | — | 0.23 | 0.06 | 0.13 |

TABLE 2

|  |  |  | Ink |  |  |  |  |  |  |
|---|---|---|---|---|---|---|---|---|---|
|  |  |  | 7 | 8 | 9 | 10 | 11 | 12 | 13 |
| Coloring material | Cyan pigment dispersion |  | 15.0 | 15.0 | 15.0 | — | 15.0 | 15.0 | 15.0 |
|  | Magenta pigment dispersion |  | — | — | — | 30.0 | — | — | — |
| Organic solvent | N,N-dimethyl-β-buthoxy propionamide |  | 2.0 | 3.0 | 5.0 | 2.0 | 5.0 | 5.0 | 3.0 |
|  | 3-ethyl-3-hydroxymethyl oxetane |  | — | — | 3.0 | — | 3.0 | — | — |
|  | 1,2-butane diol |  | — | — | — | — | — | 5.0 | — |
|  | N,N-dimethyl-β-ethoxy propionamide |  | — | — | — | 2.0 | — | — | — |
|  | 1,3-butane diol |  | — | — | — | — | — | — | 5.0 |
|  | 1,3-propanediol |  | — | 20.0 | 20.0 | — | 22.0 | — | — |
|  | 1,2-propanediol |  | 16.0 | 16.0 | 16.0 | 28.0 | 16.0 | 25.0 | 24.0 |
|  | 1-methoxy-2-propanol |  | 18.0 | — | — | — | — | — | — |
| Resin | Urethane resin particle | Polycarbonate-based urethane resin particle 1 | — | — | 5.0 | 3.0 | 5.0 | — | 18.0 |
|  |  | Polycarbonate-based urethane resin particle 2 | — | — | — | — | — | — | — |
|  |  | Polyether-based urethane resin particle | — | 3.0 | — | — | — | — | — |
|  |  | Polycarbonate-based urethane resin particle 3 | 2.0 | — | — | — | — | — | — |
|  | Acrylic resin particle | Acrylic silicone resin particle | 16.0 | 13.0 | — | 13.0 | 11.0 | 18.0 | — |
|  |  | Styrene acrylic resin particle | — | — | 11.0 | — | — | — | — |
| Surfactant | Polyether-modified siloxane surfactant |  | — | 2.0 | 2.0 | 2.0 | 2.0 | 2.0 | — |
|  | Nonionic surfactant |  | 2.0 | — | — | — | — | — | 2.0 |
| Wax | Polyethylene wax |  | — | — | — | — | 0.2 | — | — |
|  | Water |  | Rest | Rest | Rest | Rest | Rest | Rest | Rest |
|  | Total (Percent by mass) |  | 100 | 100 | 100 | 100 | 100 | 100 | 100 |
|  | Mass ratio (urethane resin particle/acrylic resin particle) |  | 0.13 | 0.23 | 0.46 | 0.23 | 0.46 | — | — |

In Tables 1 and 2, the product names and the manufacturing companies of the ingredients are as follows:

Organic Solvent

N,N-dimethyl-β-buthoxy propionamide: B100, boiling point: 252 degrees C., manufactured by Tdemitsu Kosan Co., Ltd.

3-ethyl-3-hydroxymethyl oxetane: EHO, boiling point 227 degrees C., manufactured by Ube Industries, Ltd.

1,2-butane diol: boiling point: 195 degrees C., manufactured by Shinko Organic Chemical Industry Limited N,N-dimethyl-β-ethoxy propion amide represented by the following Chemical formula 4: M100, boiling point: 216 degrees C., manufactured by Idemitsu Kosan Co., Ltd.

Chemical formula 4

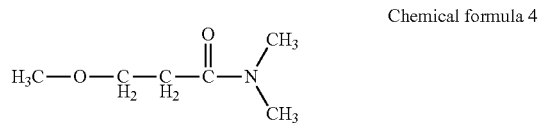

1,3-butane diol: boiling point: 204 degrees C., manufactured by Tokyo Chemical Industry Co. Ltd.

1,3-butane diol: boiling point: 214 degrees C., manufactured by Tokyo Chemical Industry Co. Ltd.

1,2-propane diol (boiling point: 188 degrees C., manufactured by ADEKA CORPORATION)

1-methoxy-2-propanol: boiling point: 121 degrees C., manufactured by Tokyo Chemical Industry Co. Ltd.

Resin

Acrylic Resin

Acrylic silicone resin particle: SYMAC® US480, manufactured by TOAGOSEI CO., LTD.

Styrene acrylic resin particle: Polyzol AP-1120, manufactured by Showa Denko K.K. Urethane Resin Polycarbonate-based urethane resin particle 1: TAKELAC™ W6110, glass transition temperature: −20 degrees C., manufactured by Mitsui Chemicals, Inc.):

Polycarbonate-based urethane resin particle 2: TAKELAC™ W6061, glass transition temperature: 25 degrees C., manufactured by Mitsui Chemicals, Inc.):

Polyether-based urethane resin particle: TAKELAC™ W5661, glass transition temperature: 70 degrees C., manufactured by Mitsui Chemicals, Inc.

Polycarbonate-based urethane resin particle 3: TAKELAC™ W6010, glass transition temperature: 90 degrees C., manufactured by Mitsui Chemicals, Inc.):

Surfactant

Polyether-modified siloxane surfactant: TEGO Wet 270, manufactured by Evonik Industries AG Nonionic surfactant: Surfynol 465, manufactured by Air Product and Chemicals, Inc Wax Polyethylene wax: Aquapetro DP2502C, manufactured by TOYO ADL CORPORATION Examples 1 to 14, Comparative Examples 1 and 2, and Reference Examples 1 and 2

Image Forming

Using the obtained Inks 1 to 13, images were recorded on both sides of a recording medium by an inkjet printing system (RICOH Pro VC60000, manufactured by Ricoh Company Ltd.) to evaluate the images. As the recording medium, roll paper of Lumi Art Gloss 90 gsm or 200 gsm (sheet width: 520.7 mm, manufactured by Stora Enso) was mounted to record solid images with a resolution of 1,200 dpi.

Figure 6:
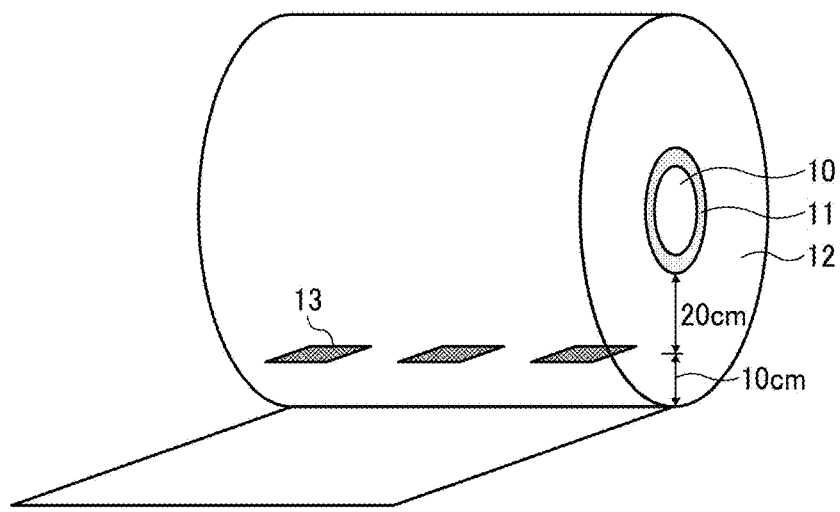
FIG. 6 is a perspective view illustrating an example of continuous paper (roll paper) having an image thereon.
Figure 7:
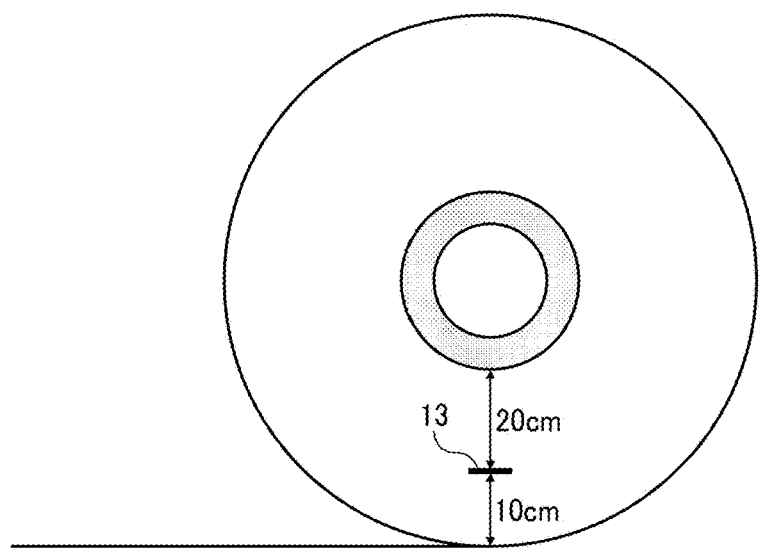
FIG. 7 is a side view illustrating the continuous paper (roll paper) having an image thereon illustrated in FIG. 6.

Using Rewinding module RW6 (manufactured by Hunkeler) as the rolling-up device, the rolling-up tension was changed to change the pressure applied to the image as shown in Table 3 to evaluate blocking resistance, abrasion resistance, and gloss. Thereafter, once the recording was finished, paper was mounted again. Changing the first to the second ink, solid images with a resolution of 1,200 dpi were recorded to evaluate "position displacement when the second ink was applied". The pressure applied to the image was measured by a pressure pattern measuring system (I-SCAN, manufactured by NITTA Corporation) and a sensor sheet (I-SCAN#5027, manufactured by NITTA Corporation). As illustrated in FIGS. 6 and 7, continuous paper 12 having a roll form was rolled up and a sensor sheet 13 to measure a pressure was disposed at the position of 20 cm outside of the outer perimeter of a paper core 11 having a hollow portion 10. The sensor sheet 13 was disposed at three sites having different positions along the width direction of the continuous paper 12 to have three measuring points. Thereafter, the continuous paper 13 was continuously rolled up. The pressure was measured in the state in which paper piled up 10 cm from the three measuring sites. The average of the pressure at the three sites was determined as the pressure applied to the image.

With regard to Lumi Art Gloss 90 gsm, the transfer amount of pure water in a contact time of 100 ms and 400 ms was respectively 2.9 mL/m$^2$ and 4.9 mL/m$^2$ when measured by dynamic scanning absorptometer (Kuga, Shigenori, Dynamic scanning absorpmenter (DSA); Journal of JAPAN TAPPI, published in May 1994, Vol. 48, pp. 88-92).

With regard to Lumi Art Gloss 200 gsm, the transfer amount of pure water in a contact time of 100 ms and 400 ms was respectively 3.0 mL/m$^2$ and 5.0 mL/m$^2$ when measured by dynamic scanning absorptometer (Kuga, Shigenori, Dynamic scanning absorpmenter (DSA); Journal of JAPAN TAPPI, published in May 1994, Vol. 48, pp. 88-92).

Comparative Example 3

Image Forming

Using the obtained Ink 1, images were recorded on both sides of a recording medium using an inkjet printing system (IPSio GXe3300, manufactured by Ricoh Company Ltd.) to evaluate the images. As shown in Table 3, as the recording medium, cut sheets of Lumi Art Gloss 90 gsm was set and solid images were recorded with a resolution of 1,200 dpi. The pressure applied to the image was measured by a pressure pattern measuring system (I-SCAN, manufactured by NITTA Corporation) and a sensor sheet (I-SCAN#5027 (manufactured by NITTA Corporation) was inserted at 10 cm high above the bottom surface of the recording media. The average of the three measuring sites was used.

Blocking Resistance

The attachment degree of the recorded images and the transfer (detached, offset) of the image were visually observed to evaluate abrasion resistance according to the following evaluation criteria.

Evaluation Criteria

A: No image transfer

B: Slight attachment is felt when detached but no image transfer

C: Image transfer observed

Abrasion Resistance

Each of the obtained images was abraded 20 times with paper (Lumi Art Gloss 90 gsm) cut to a size of 1.2 mm×1.2 mm. Thereafter, using a reflection type color spectroscopy densitometer (manufactured by X-Rite), ink attachment contamination to paper was measured. The concentration of the abraded paper was calculated by subtracting the background color to evaluate abrasion resistance according to the following evaluation criteria.

Evaluation Criteria

A: Transfer concentration was less than 0.05
B: Transfer concentration was 0.05 to less than 0.10
C: Transfer concentration was 0.10 or greater Gloss Using a gloss meter (Micro-TRI-Gloss 4520, manufactured by BYK Gardener), 60 degrees gloss was measured for each of the obtained images to evaluate gloss before and after the pressure application. When images were detached (offset), no value was assigned because it was impossible to measure (— as shown in Table 3).

Position Displacement at Time of Ink Application for Second Time

Position displacement against the ink for the first time was visually observed to evaluate position displacement at the time of ink application for the second time according to the following evaluation criteria.

Evaluation Criteria

N (No): No position displacement
Y (Yes): Position displacement observed

TABLE 3

|  |  | Ink No. | Recording Medium | Tackiness Power (nN) | Pressure applied to image (kg/cm$^2$) | Area ratio (B/A) |
|---|---|---|---|---|---|---|
| Example | 1 | 1 | Lumi Art Gloss 90 | 100 | 5.8 | 0.68 |
|  | 2 | 1 | Lumi Art Gloss 90 | 100 | 7.9 | 0.68 |
|  | 3 | 1 | Lumi Art Gloss 200 | 100 | 3.7 | 0.68 |
|  | 4 | 1 | Lumi Art Gloss 90 | 100 | 3.8 | 0.68 |
|  | 5 | 2 | Lumi Art Gloss 90 | 80 | 5.8 | 0.16 |
|  | 6 | 3 | Lumi Art Gloss 90 | 110 | 7.9 | 2.25 |
|  | 7 | 4 | Lumi Art Gloss 90 | 87 | 5.8 | 0.51 |
|  | 8 | 5 | Lumi Art Gloss 90 | 85 | 5.8 | 0.21 |
|  | 9 | 6 | Lumi Art Gloss 90 | 86 | 5.8 | 0.31 |
|  | 10 | 7 | Lumi Art Gloss 90 | 85 | 5.8 | 0.31 |
|  | 11 | 8 | Lumi Art Gloss 90 | 88 | 5.8 | 0.51 |
|  | 12 | 9 | Lumi Art Gloss 90 | 102 | 5.8 | 0.69 |
|  | 13 | 10 | Lumi Art Gloss 90 | 89 | 5.8 | 0.52 |
|  | 14 | 11 | Lumi Art Gloss 90 | 107 | 5.8 | 0.67 |
| Reference Example | 1 | 1 | Lumi Art Gloss 90 | 100 | 3.1 | 0.68 |
|  | 2 | 1 | Lumi Art Gloss 90 | 100 | 8.2 | 0.68 |
| Comparative Example | 1 | 12 | Lumi Art Gloss 90 | 70 | 5.8 | 0.12 |
|  | 2 | 13 | Lumi Art Gloss 90 | 120 | 5.8 | 2.23 |
|  | 3 | 1 | Lumi Art Gloss 90 | 100 | 0.1 | 0.68 |

| | | | | | Evaluation Results | | |
|---|---|---|---|---|---|---|---|
| | | | | | | Gloss | Position displacement at time of ink |
| | | | Ink No. | Blocking Resistance | Abrasion resistance | Before pressure application | After pressure application | application for the second time |
| Example | 1 | 1 | A | A | 31 | 40 | NO |
|  | 2 | 1 | A | A | 31 | 42 | NO |
|  | 3 | 1 | A | A | 31 | 39 | NO |
|  | 4 | 1 | A | A | 31 | 38 | NO |
|  | 5 | 2 | A | B | 32 | 40 | NO |

TABLE 3-continued

|  |  |  |  |  |  |  |  |
|---|---|---|---|---|---|---|---|
|  | 6 | 3 | B | A | 31 | 41 | NO |
|  | 7 | 4 | A | A | 33 | 40 | NO |
|  | 8 | 5 | A | B | 33 | 40 | NO |
|  | 9 | 6 | A | B | 32 | 40 | NO |
|  | 10 | 7 | A | B | 31 | 41 | NO |
|  | 11 | 8 | A | A | 32 | 40 | NO |
|  | 12 | 9 | A | A | 30 | 41 | NO |
|  | 13 | 10 | A | A | 31 | 41 | NO |
|  | 14 | 11 | A | A | 35 | 45 | NO |
| Reference | 1 | 1 | A | A | 31 | 33 | YES |
| Example | 2 | 1 | C | A | 31 | — | NO |
| Comparative | 1 | 12 | A | C | 30 | 40 | NO |
| Example | 2 | 13 | C | A | 31 | — | NO |
|  | 3 | 1 | A | C | 31 | 31 | — |

Aspects of the present disclosure are, for example, as follows.

1. An image forming method includes applying an ink for the first time to a recording medium to form an image and rolling up the recording medium in a roll form, wherein the recording medium is continuous paper, the ink includes water, an organic solvent, and a coloring material, and the image has a tackiness power of from 80 to 110 nN.

2. The image forming method according to 1 mentioned above, wherein a pressures is applied during the rolling up.

3. The image forming method according to 1 or 2 mentioned above, wherein the pressure is from 3.5 to 8.0 kg/cm$^2$.

4. The image forming method according to any one of 1 to 3 mentioned above, further includes applying another ink or the same ink as that of 1 mentioned above for the second time to the surface to which the ink is applied after the rolling up.

5. The image forming method according to any one of 1 to 4 mentioned above, wherein the tackiness power is from 85 to 100 nN.

6. The image forming method according to any one of 1 to 5 mentioned above, wherein the recording medium includes a substrate and an application layer provided on at least one side of the substrate, the transfer amounts of pure water to the recording medium in a contact time of 100 ms and in a contact time of 400 ms as measured by a dynamic scanning absorptometer are respectively 2 to 35 mL/m$^2$ and 3 to 40 mL/m$^2$.

7. The image forming method according to 1 mentioned above, wherein a pressure to the image occurs by rolling-up the continuous paper after the ink is applied, the recording medium includes a substrate and an application layer provided on at least one side of the substrate, and transfer amounts of pure water to the recording medium in a contact time of 100 ms and in a contact time of 400 ms as measured by a dynamic scanning absorptometer are respectively 2 to 35 mL/m$^2$ and 3 to 40 mL/m$^2$.

8. The image forming method according to any one of 1 to 7 mentioned above, wherein the ink further includes polyethylene wax accounting for 0.05 to 0.45 percent by mass of the total amount of the ink.

9. The image forming method according to any one of 1 to 8 mentioned above, wherein the ink contains an acrylic resin particle and a urethane resin particle, the mass ratio (urethane resin particle/acrylic resin particle) of the urethane resin particle to the acrylic resin particle is from 0.03 to 0.7.

10. The image forming method according to 9 mentioned above, wherein the urethane resin particle has a glass transition temperature of from −20 to 70 degrees C.

11. The image forming method according to 9 or 10 mentioned above, wherein the urethane resin particle includes a polycarbonate urethane resin particle.

12. The image forming method according to any one of 9 to 11 mentioned above, wherein the acrylic resin particle includes an acrylic silicone resin particle.

13. The image forming method according to any one of 1 to 12 mentioned above, wherein the organic solvent includes at least one of N,N-dimethyl-β-buthoxypropionamide, N,N,-dimethyl-β-ethoxy propionamide, and 3-ethyl-3-hydroxymethyloxetane.

14. The image forming method according to any one of 9 to 13 mentioned above, wherein each of the acrylic resin particle and the urethane resin particle has a volume average particle diameter of from 10 to 1,000 nm.

15. The image forming method according to any one of 9 to 14 mentioned above, wherein the total proportion of the acrylic resin particle and the urethane resin particle is from 1 to 30 percent by mass.

16. The image forming method according to any one of 1 to 15 mentioned above, wherein the ink further includes a surfactant.

17. The image forming method according to 16 mentioned above, wherein the surfactant is a polyether-modified siloxane surfactant and/or a nonionic surfactant.

18. An image forming apparatus includes a recording medium, an ink applying device to apply an ink to the recording medium to form an image and a rolling-up device to roll up the recording medium in a roll form, wherein the recording medium is continuous paper, the ink includes water, an organic solvent, and a coloring material, and the image has a tackiness power of from 80 to 110 nN.

19. An image forming system includes a recording medium, an ink applying device to apply an ink to the recording medium to form an image and a rolling-up device to roll up the recording medium in a roll form, wherein the recording medium is continuous paper, the ink includes water, an organic solvent, and a coloring material, and the image has a tackiness power of from 80 to 110 nN.

20. A method of manufacturing recording medium (continuous paper) rolled up in a roll form includes applying ink for the first time to a recording medium to form an image thereon and rolling up the recording medium to which the ink is applied in a roll form. The recording medium is continuous paper. The ink includes water, an organic solvent, and a coloring material. The image has a tackiness power of from 80 to 110 nN. A pressure is applied to the image due to the rolling-up process.

According to the present disclosure, an image forming method is provided which is free of detachment of an image under a pressure and produces images having good blocking resistance, abrasion resistance, and high gloss.

Having now fully described embodiments of the present invention, it will be apparent to one of ordinary skill in the art that many changes and modifications can be made thereto without departing from the spirit and scope of embodiments of the invention as set forth herein.

What is claimed is:

1. An image forming method comprising:
   applying an ink for the first time to a recording medium to form an image; and
   rolling up the recording medium in a roll form,
   wherein the recording medium is continuous paper,
   wherein the ink includes water, an organic solvent, and a coloring material, and
   wherein the image has a tackiness power of from 80 to 110 nN.

2. The image forming method according to claim 1, wherein a pressure is applied during the rolling up.

3. The image forming method according to claim 2, wherein the pressure is from 3.5 to 8.0 kg/cm$^2$.

4. The image forming method according to claim 1, further comprising applying an ink for the second time to a surface to which the ink is applied for the first time after the rolling up.

5. The image forming method according to claim 1, further comprising applying the ink for the second time to a surface to which the ink is applied for the first time after the rolling up.

6. The image forming method according to claim 1, wherein the tackiness power is from 85 to 100 nN.

7. The image forming method according to claim 1, wherein the recording medium includes a substrate and a coated layer provided on at least one side of the substrate, wherein transfer amounts of pure water to the recording medium in a contact time of 100 ms and 400 ms as measured by a dynamic scanning absorptometer are respectively 2 to 35 mL/m$^2$ and 3 to 40 mL/m$^2$.

8. The image forming method according to claim 7, wherein a pressure is applied during the rolling up.

9. The image forming method according to claim 1, wherein the ink further comprises polyethylene wax accounting for 0.05 to 0.45 percent by mass of a total amount of the ink.

10. The image forming method according to claim 1, wherein the organic solvent includes at least one of N,N-dimethyl-β-buthoxypropionamide, N,N,-dimethyl-β-ethoxy propionamide, and 3-ethyl-3-hydroxymethyloxetane.

11. The image forming method according to claim 1, wherein the ink further comprises a polyether-modified siloxane surfactant and a nonionic surfactant.

12. The image forming method according to claim 1, wherein the ink contains an acrylic resin particle and a urethane resin particle, wherein a mass ratio (urethane resin particle/acrylic resin particle) of the urethane resin particle to the acrylic resin particle is from 0.1 to 0.7.

13. The image forming method according to claim 12, wherein the urethane resin particle has a glass transition temperature of from −20 to 70 degrees C.

14. The image forming method according to claim 12, wherein the urethane resin particle includes a polycarbonate urethane resin particle.

15. The image forming method according to claim 12, wherein the acrylic resin particle includes an acrylic silicone resin particle.

16. The image forming method according to claim 12, wherein each of the acrylic resin particle and the urethane resin particle has a volume average particle diameter of from to 1,000 nm.

17. An image forming apparatus comprising:
   a recording medium;
   an applying device configured to apply an ink to the recording medium to form an image; and
   a rolling-up device configured to roll up the recording medium in a roll form;
   wherein the recording medium is continuous paper,
   wherein the ink includes water, an organic solvent, and a coloring material,
   wherein the image has a tackiness power of from 80 to 110 nN.

18. An image forming system comprising:
   a recording medium;
   an applying device configured to apply an ink to the recording medium to form an image; and
   a rolling-up device configured to roll up the recording medium in a roll form;
   wherein the recording medium is continuous paper,
   wherein the ink includes water, an organic solvent, and a coloring material,
   wherein the image has a tackiness power of from 80 to 110 nN.

* * * * *